(12) United States Patent  
Dobek et al.

(10) Patent No.: US 9,181,981 B2
(45) Date of Patent: Nov. 10, 2015

(54) BEARING SYSTEM AND METHOD FOR LUBRICATION

(75) Inventors: Louis J. Dobek, Somers, CT (US); David M. Daley, Manchester, CT (US); Mark A. Metzger, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 2597 days.

(21) Appl. No.: 12/033,911

(22) Filed: Feb. 20, 2008

(65) Prior Publication Data

US 2009/0208151 A1 Aug. 20, 2009

(51) Int. Cl.
*F16C 19/00* (2006.01)
*F16C 33/66* (2006.01)

(52) U.S. Cl.
CPC ......... *F16C 33/6681* (2013.01); *F16C 33/6659* (2013.01); *F16C 2360/23* (2013.01)

(58) Field of Classification Search
USPC ................. 384/462, 465, 466, 468, 470–475; 184/6.11, 6.16; 415/175, 176
See application file for complete search history.

(56) References Cited

U.S. PATENT DOCUMENTS

| | | | |
|---|---|---|---|
| 2,838,348 A * | 6/1958 | Hamm | 384/466 |
| 2,897,024 A * | 7/1959 | Chenea | 384/470 |
| 3,722,967 A * | 3/1973 | Lewis | 384/466 |
| 3,811,743 A | 5/1974 | Wren | |
| 4,283,096 A | 8/1981 | Picard | |
| 4,323,289 A | 4/1982 | Suzuki | |
| 4,345,799 A * | 8/1982 | Crofts | 384/470 |
| 4,385,788 A | 5/1983 | Brown | |
| 4,400,040 A | 8/1983 | Toth | |
| 4,428,628 A | 1/1984 | Brown | |
| 4,541,738 A * | 9/1985 | Leibensperger et al. | 384/470 |
| 4,787,757 A | 11/1988 | Finger | |
| 5,106,209 A | 4/1992 | Atkinson et al. | |
| 5,183,342 A * | 2/1993 | Daiber et al. | 384/475 |
| 5,201,844 A | 4/1993 | Greenwood | |
| 5,328,277 A | 7/1994 | Moulton | |
| 6,464,401 B1 | 10/2002 | Allard | |
| 6,471,411 B2 | 10/2002 | VonHackewitz | |

FOREIGN PATENT DOCUMENTS

| | | |
|---|---|---|
| DE | 102006014108 | 9/2007 |
| EP | 1039160 | 9/2000 |

(Continued)

OTHER PUBLICATIONS

European Search Report dated Jun. 15, 2009.

(Continued)

*Primary Examiner* — James Pilkington
(74) *Attorney, Agent, or Firm* — Carlson, Gaskey & Olds, P.C.

(57) ABSTRACT

A bearing system includes a first bearing ring, a second bearing ring spaced radially outwards from the first bearing ring, and a bearing cage between the first bearing ring and the second bearing ring. The bearing cage includes a circumferential outer side, a circumferential inner side, and a plurality of circumferentially spaced retainer portions between an axially forward end and an axially trailing end. Roller elements are located in the plurality of retainer portions of the bearing cage. At least one fluid nozzle is axially spaced from the bearing cage for dispensing a fluid to the roller elements.

26 Claims, 10 Drawing Sheets

(56) References Cited

FOREIGN PATENT DOCUMENTS

| | | |
|---|---|---|
| EP | 1640627 | 3/2006 |
| GB | 579252 | 7/1946 |
| GB | 821346 | 11/1955 |

OTHER PUBLICATIONS

Extended European Search Report for Application No. EP11191779.5 dated Jan. 11, 2012.

* cited by examiner

BEARING SYSTEM AND METHOD FOR LUBRICATION

BACKGROUND OF THE INVENTION

This disclosure relates generally to bearing systems and, more particularly, to a new arrangement that reduces a need for fluid passages through components of the bearing system.

Gas turbine engines and other types of machinery typically utilize bearing assemblies. A typical bearing assembly may bear relatively high centrifugal and operating loads that result in relatively high stress levels on components of the bearing assembly, such as an inner ring.

The stress levels on the inner ring may be amplified by the particular design. For instance, some inner ring designs include slots that are used to deliver oil to bearing elements within a raceway. In some designs, the inner ring may include axial slots and radial holes that extend radially outwards from the axial slots. The oil flows through the axial slots and outwards through the radial holes to provide lubrication. The intersection between the axial slots and the radial holes may amplify stresses in the inner ring.

SUMMARY OF THE INVENTION

The disclosed examples may provide various benefits, including facilitating reduction of internal stresses in a bearing system.

For instance, an example bearing system eliminates the need for the radial slots of prior bearing assemblies by delivering the fluid using a fluid nozzle. In particular, the bearing system may include a first bearing ring, a second bearing ring spaced radially outwards from the first bearing ring, and a bearing cage between the first bearing ring and the second bearing ring. The bearing cage includes a circumferentially outer side, a circumferentially inner side, and circumferentially spaced retainer portions between an axially forward end and an axially trailing end. Roller elements are located within the plurality of retainer portions. At least one fluid nozzle is axially spaced from the bearing cage for dispensing the fluid to the roller elements, raceways and cage. For example, such an arrangement eliminates the intersection between axial slots and radial holes and thereby reduces inner ring concentrated stresses.

In one example, the bearing system is included in a gas turbine engine.

The disclosed examples also provide a method of delivering a fluid (e.g., oil) to a bearing system. For instance, the method includes delivering the fluid to the fluid nozzle and dispensing the fluid between the bearing cage and one of the bearing rings.

BRIEF DESCRIPTION OF THE DRAWINGS

The various features and advantages of the disclosed examples will become apparent to those skilled in the art from the following detailed description. The drawings that accompany the detailed description can be briefly described as follows.

FIG. 4 illustrates an isolated view of a bearing cage from the bearing system of the previous figures.

DETAILED DESCRIPTION OF THE PREFERRED EMBODIMENT

Figure 1:
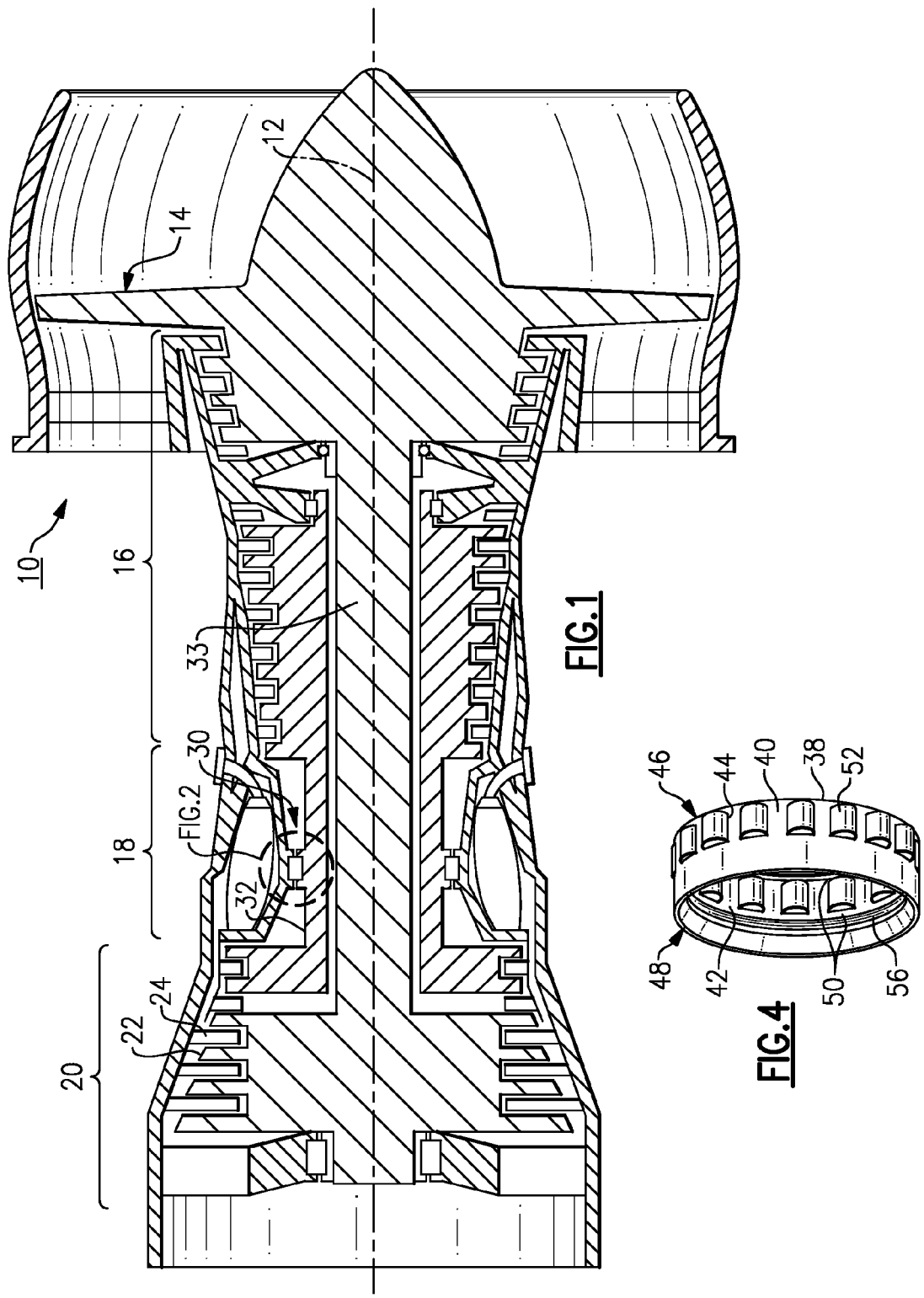
FIG. 1 illustrates an example gas turbine engine including a bearing system.

FIG. 1 illustrates selected portions of an example gas turbine engine 10, such as a gas turbine engine 10 used for propulsion. In this example, the gas turbine engine 10 is circumferentially disposed about an engine centerline 12. The engine 10 includes a fan 14, a compressor section 16, a combustion section 18, and a turbine section 20 that includes turbine blades 22 and turbine vanes 24. As is known, air compressed in the compressor section 16 is mixed with fuel that is burned in the combustion section 18 to produce hot gasses that are expanded in the turbine section 20 to drive the fan 14. FIG. 1 is for illustrative purposes only and is not a limitation on the disclosed examples. Additionally, there are various other types of gas turbine engines, such as geared architecture engines, which may benefit from the examples disclosed herein.

The gas turbine engine 10 includes a bearing system 30 associated with a shaft 32 that rotates along the engine centerline 12. The shaft 32 in this example rotates with a high pressure portion of the turbine section 20 and a high pressure portion of the compressor section 16. However, it is to be understood that the bearing system 30 may also be applied to other portions of an engine, such as a low pressure shaft 33, or to other types of machines.

Figure 2:
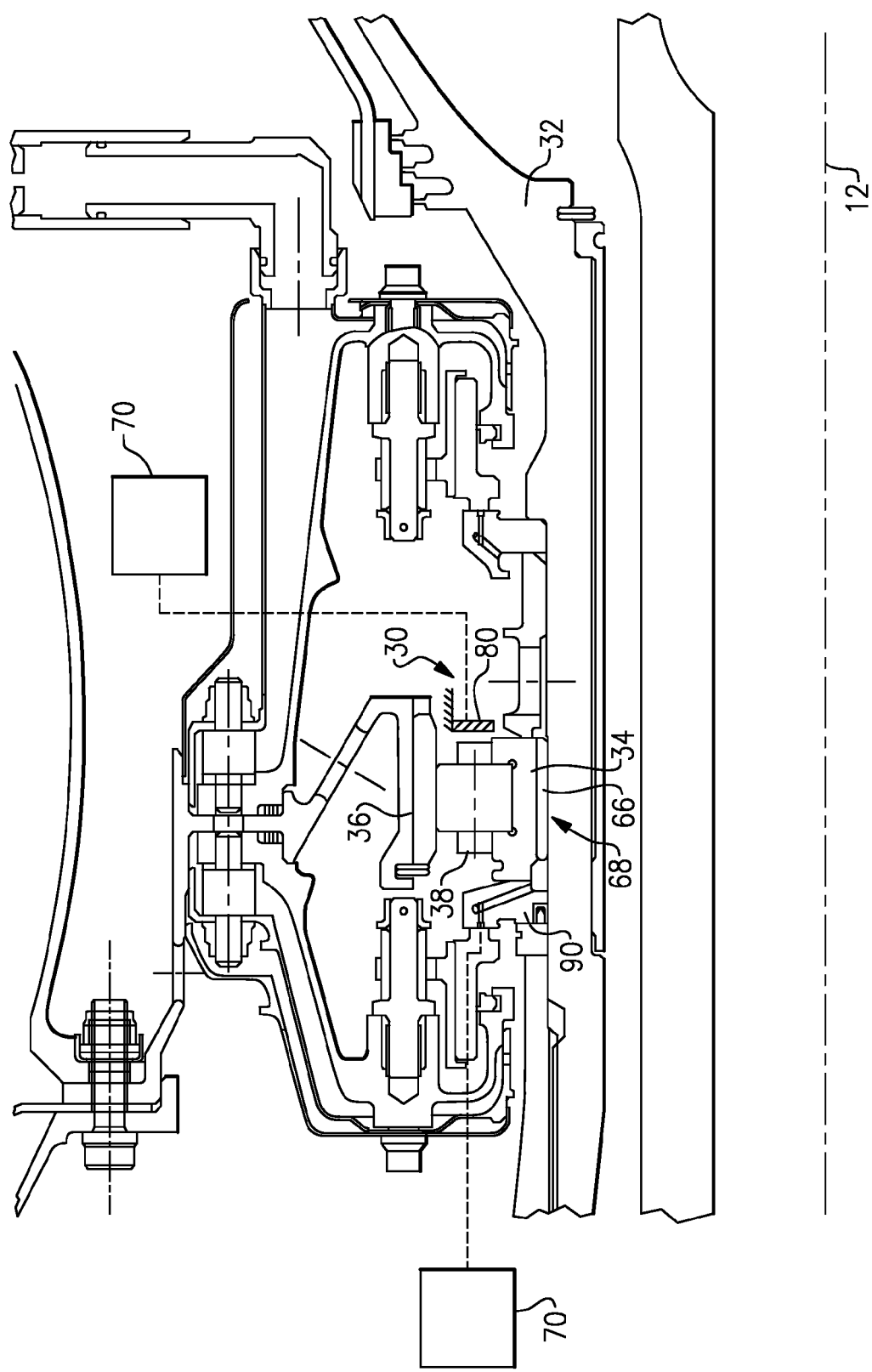
FIG. 2 illustrates a view of the bearing system of FIG. 1.
Figure 3:
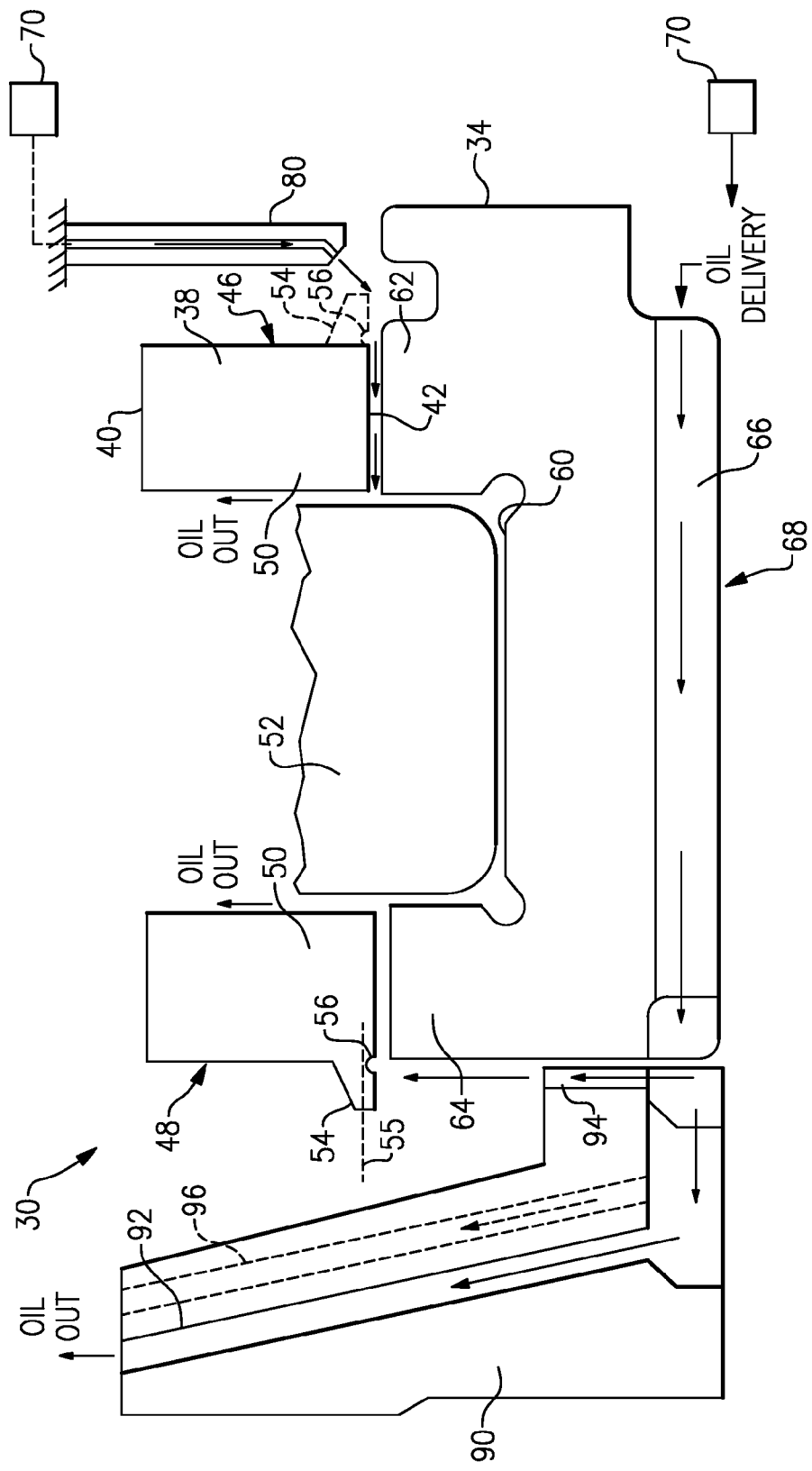
FIG. 3 illustrates another view of the bearing system of FIG. 1.

Referring to FIGS. 2 and 3, the bearing system 30 includes an inner or first bearing ring 34 that is coupled in a known manner with the shaft 32, and an outer or second bearing ring 36 that is spaced radially outwards from the first bearing ring 34. A bearing cage 38 is located between the first bearing ring 34 and the second bearing ring 36. As shown in FIG. 4, the bearing cage 38 includes a circumferential outer side 40, a circumferential inner side 42, and a plurality of circumferentially spaced retainer portions 44 that are located between an axially forward end 46 and an axially trailing end 48. Cage lands 50 extend between the circumferentially spaced retainer portions 44 and the axially forward end 46 and the axially trailing end 48.

The first bearing ring 34 includes a raceway 60 (FIG. 3) that is located between a forward ring land 62 and a trailing ring land 64 that generally protrude radially outwards from the raceway 60. Roller elements 52 are located within the retainer portions 44 of the bearing cage 38. Thus, the bearing cage 38 serves to retain the roller elements 52 and maintain a circumferential spacing between the roller elements 52. For example, the roller elements 52 may be any of the various types of bearing elements known in the art, including cylindrical, ball, tapered, etc.

The bearing cage 38 also includes a scoop 54 that protrudes along an axis 55 from the axially trailing end 48 of the bearing cage 38. As will be described, the scoop 54 facilitates interception of fluid (e.g., oil), which may serve to lubricate and cool the bearing system 30 and flush foreign particles from the bearing system 30. Optionally, the scoop 54 also includes a recess 56 that opens in a radially inward direction relative to the engine centerline 12 and further facilitates intercepting fluid. Likewise, the axially forward end 46 of the bearing cage 38 may also include a scoop 54 and recess 56 for intercepting fluid.

The first bearing ring 34 includes a fluid passage 66 that runs axially along a radially inner portion 68 of the first bearing ring 34. The fluid passage 66 is in fluid communication with an oil system 70 of the gas turbine engine 10, for delivering oil to the roller elements 52 as will be described.

A fluid nozzle 80 is axially spaced from the bearing cage 38 for dispensing oil to the roller elements 52. The fluid nozzle 80 is also in fluid communication with the oil system 70 of the gas turbine engine 10. In this regard, supply of the oil through the fluid nozzle 80 eliminates the need for radial holes that extend radially from the fluid passage 66 to the raceway 60 in the first bearing ring 34.

In operation, the oil system 70 delivers oil to the fluid nozzle 80 and to the fluid passage 66. For example, the oil system 70 is a known arrangement and includes, for example only, an oil pump to move the fluid through the oil system 70. The oil flows through the fluid passage 66 under the raceway 60 and around the end of the first bearing ring 34 radially outwards toward the trailing ring land 64. The scoop 54 and recess 56 of the bearing cage 38 intercept the oil, thereby directing the oil between the bearing cage 38 and the trailing ring land 64 to the roller elements 52.

The fluid nozzle 80 dispenses oil toward the circumferential inner side 42 of the bearing cage 38. The oil flows between the circumferential inner side 42 and the forward ring land 62 to the roller elements 52. If a scoop 54 and recess 56 are included on the axially forward end 46 of the bearing cage 38, the scoop 54 and recess 56 may intercept the oil and thereby facilitate oil flow to the roller elements 52.

The oil system 70 may provide more oil than required for the bearing system 30. In this regard, the bearing system 30 may also include a runner plate 90 adjacent the trailing ring land 64 of the first bearing ring 34. The runner plate 90 includes a plurality of fluid passages 92, 94, and 96 for receiving oil from the fluid passage 66 of the first bearing ring 34. The fluid passage 94 extends radially and directs oil toward the scoop 54, while the fluid passages 92 and 96 serve to collect surplus oil that does not flow into the fluid passage 94 and circulate the surplus oil back into the oil system 70. The fluid passages 92, 94, and 96 thereby facilitate controlling the amount of oil distributed to the roller elements 52. For example, the fluid passage 94 is axially shorter than the fluid passages 92 and 96 and thereby limits the amount of oil distributed to the lower elements 52.

Figure 5:
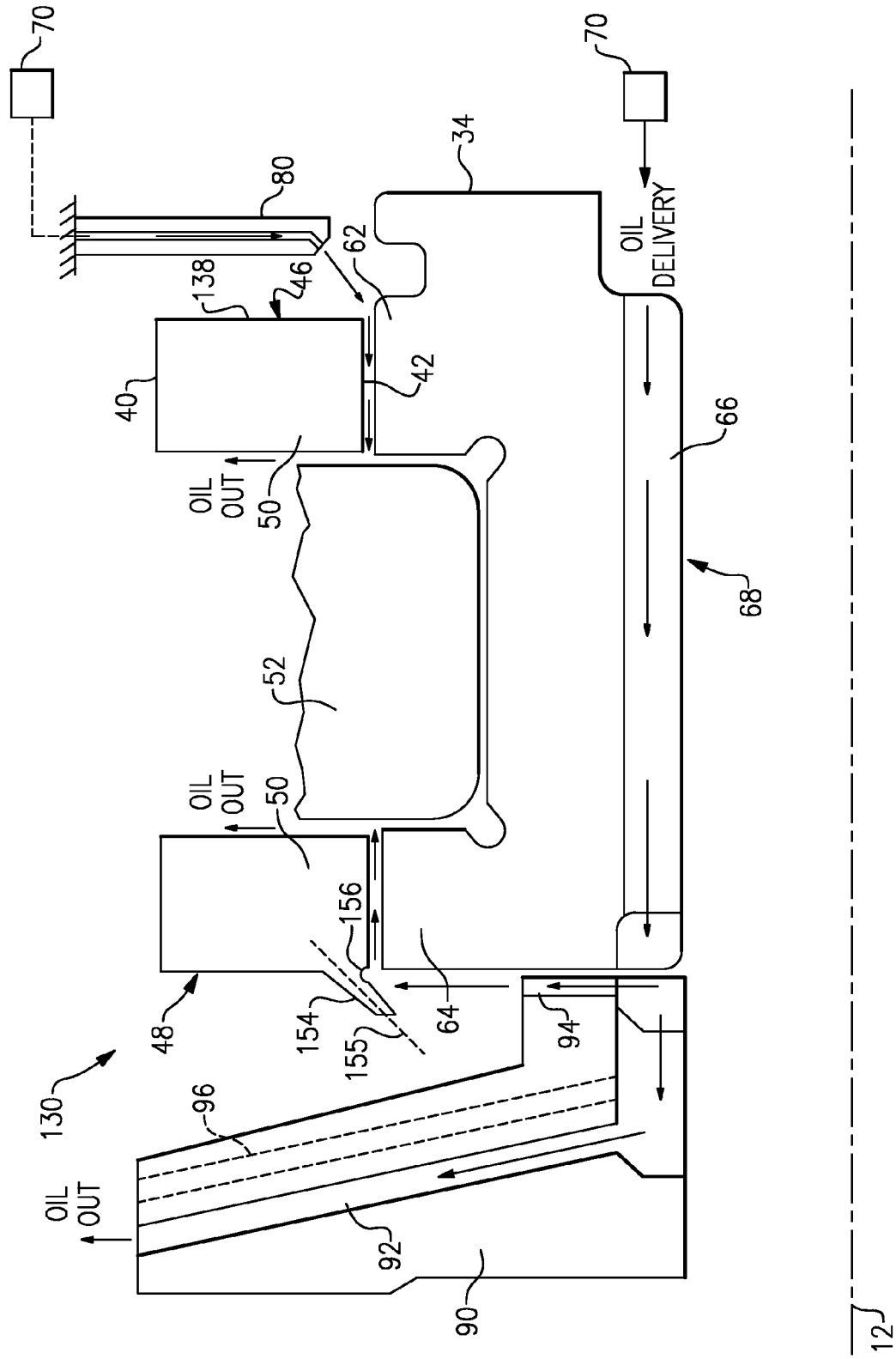
FIG. 5 illustrates another example bearing system having an oblique scoop.

FIG. 5 illustrates another example bearing system 130 that is similar to the bearing system 30 of FIG. 3, but with an alternative version of the bearing cage 38. In this disclosure, like reference numerals designate like elements where appropriate, and reference numerals with the addition of one-hundred or multiples thereof designate modified elements. A modified element incorporates the features and benefits of other modified elements, except where stated otherwise. In this example, a bearing cage 138 is substantially similar to the bearing cage 38 of FIG. 3, except that a scoop 154 extends along an oblique axis 155 relative to the engine centerline 12 from the axially trailing end 48 of the bearing cage 138. That is, the scoop 154 is angled toward the engine centerline 12 to facilitate interception of oil that flows radially outwards from the fluid passage 66 of the first bearing ring 34.

Optionally, the scoop 154 may also include a recess 156, similar to the recess 56 of the previous example. The recess 156 facilitates interception of oil from the fluid passage 66.

Figure 6:
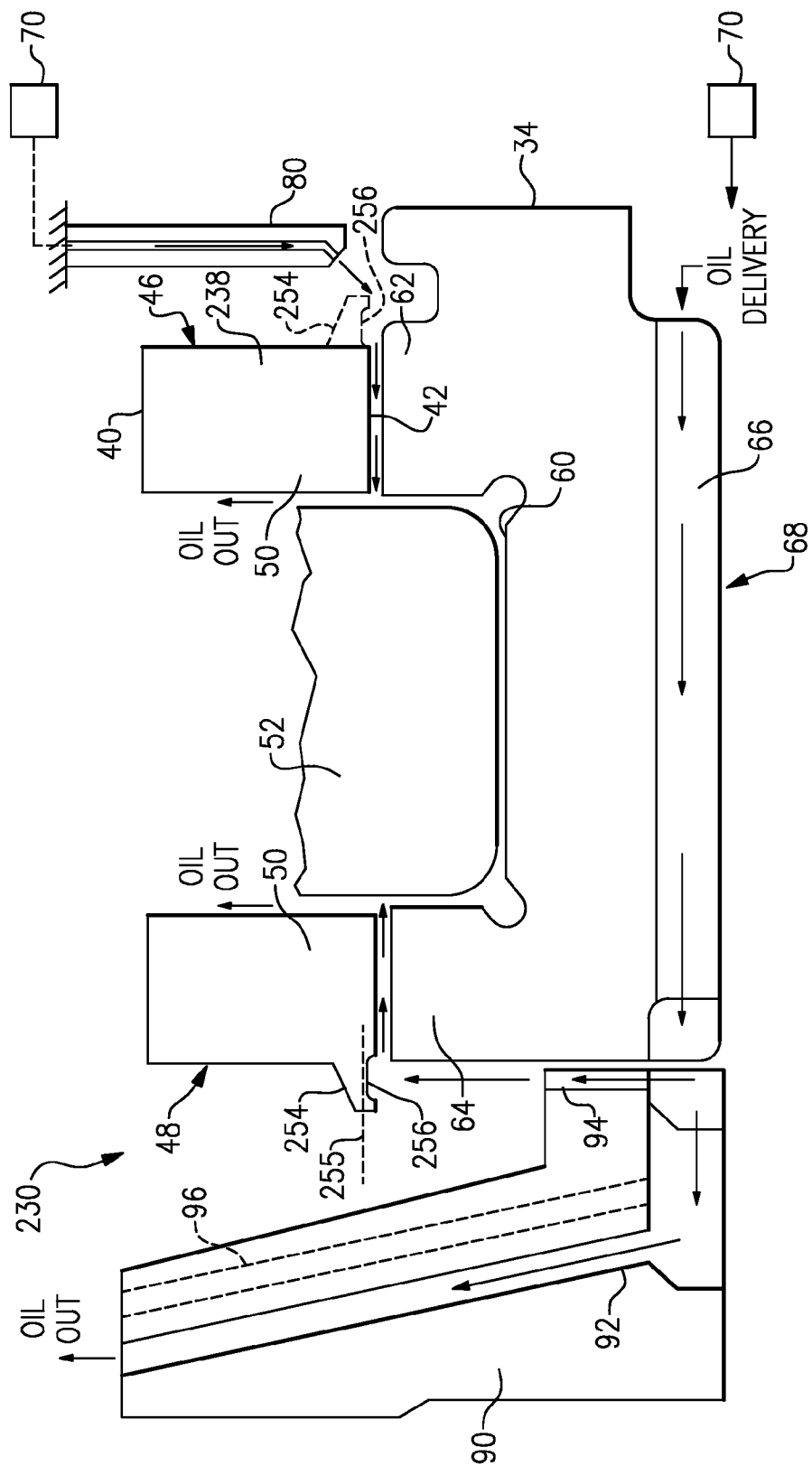
FIG. 6 illustrates another example bearing system having a scoop with a wider recess.

FIG. 6 illustrates another example bearing system 230 that is similar to the bearing system 30 of FIG. 3, but with an alternative version of the bearing cage 38. In this example, a bearing cage 238 is substantially similar to the bearing cage 38, except that a scoop 254 protrudes along an axis 255 from the axially trailing end 48 of the bearing cage 238. Similar to the scoop 54, the scoop 254 facilitates interception of oil that flows radially outwards from the fluid passage 66 of the first bearing ring 34. In this example, the scoop 254 includes a recess 256 that further facilitates interception of oil from the fluid passage 66. The recess 256 is similar to the recess 56 of FIG. 3, except that the recess 256 is axially longer.

Figure 7:
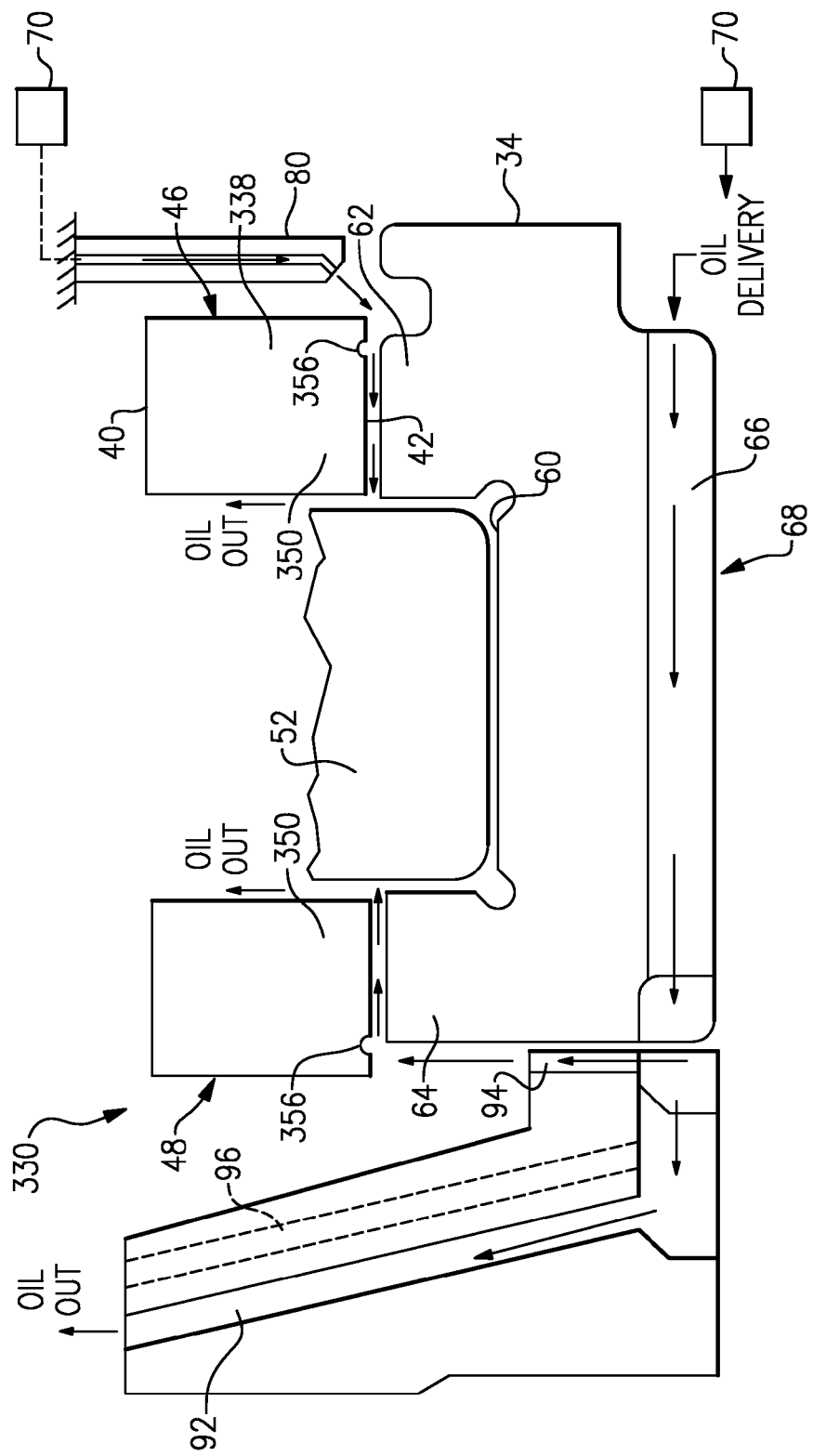
FIG. 7 illustrates another example bearing system having a wider bearing cage that includes recesses.

FIG. 7 illustrates another example bearing system 330 that is similar to the bearing system 30 of FIG. 3, but with a modified version of the bearing cage 38. In this example, a bearing cage 338 is substantially similar to the bearing cage 38, except that the cage lands 350 of the bearing cage 338 are axially longer than the cage lands 50 of the bearing cage 38 of FIG. 3. For instance, the cage lands 350 are axially longer than each of the forward ring land 62 and the trailing ring land 64 to facilitate interception of oil from the fluid passage 66. Optionally, the bearing cage 338 may also include recesses 356 that further facilitate intercepting oil.

Figure 8:
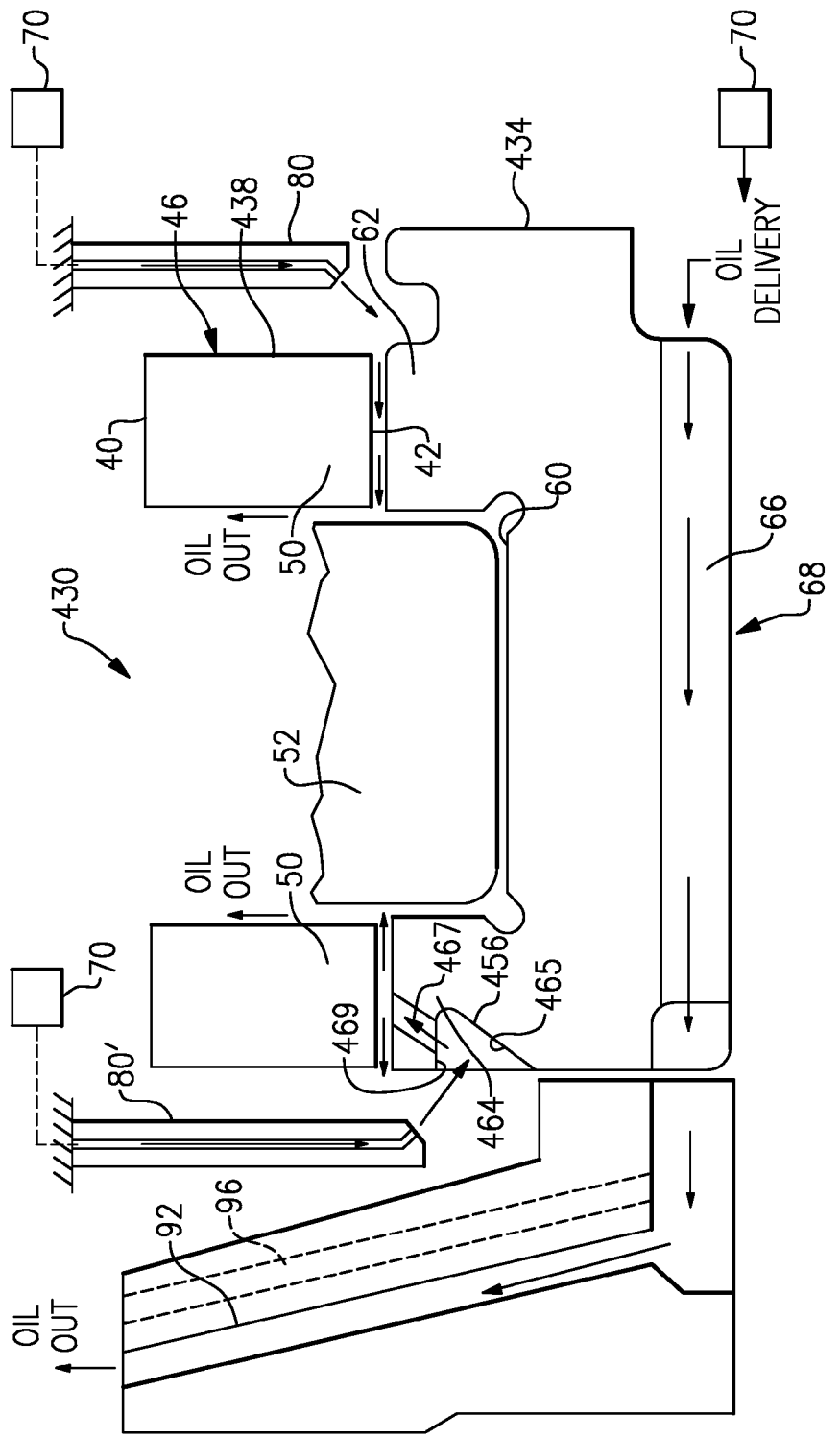
FIG. 8 illustrates another example bearing system having multiple fluid nozzles and a bearing ring that includes a recess.

FIG. 8 illustrates another example bearing system 430 that is similar to the bearing system 30 of FIG. 3. In this example, the bearing system 430 includes a bearing cage 438 that is substantially similar to the bearing cage 38, but without scoops. The bearing system 430 also includes a first bearing ring 434 that is substantially similar to the first bearing ring 34, except that the first bearing ring 434 includes a notch or recess 456 located within a forward ring land 464 to facilitate intercepting oil. The recess 456 includes an angled surface 465 that is at an oblique angle relative the engine centerline 12. A fluid passage 467 runs between a radially outer surface 469 of the recess 456 and the circumferential outer surface of the forward ring land 464. The recess 456 intercepts oil, and the fluid passage 467 facilitates delivering the oil from the recess 456 to the roller elements 52.

A second fluid nozzle 80' is axially spaced rearward of the bearing cage 438 for dispensing oil toward the recess 456. The second fluid nozzle 80' is also in fluid communication with the oil system 70 of the gas turbine engine 10. In this regard, supply of the oil through the second fluid nozzle 80' also eliminates the need for radial passages of prior designs.

Figure 9:
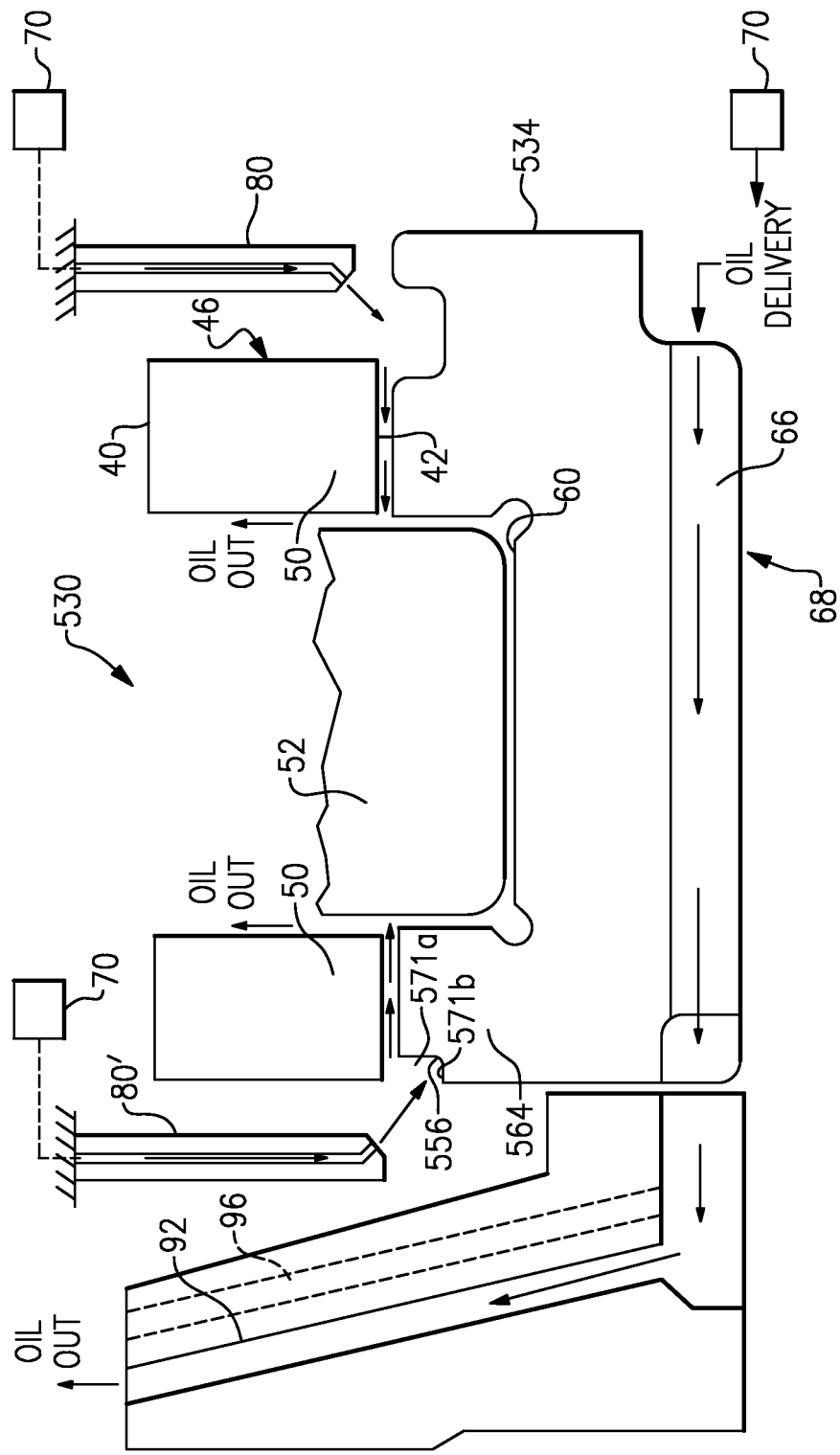
FIG. 9 illustrates another example bearing system having multiple fluid nozzles and a bearing ring that includes a recess.

FIG. 9 illustrates another example bearing system 530 that is similar to the bearing system 430 of FIG. 8. In this example, the bearing system 530 includes a first bearing ring 534 that is substantially similar to the first bearing ring 434, except that the first bearing ring 534 includes a notch or recess 556 having a different shape than the recess 456 of the previous example. The recess 556 includes substantially orthogonal surfaces 571a and 571b that are recessed from the radially outer surface and the leading end surface of the first bearing ring 534.

Figure 10:
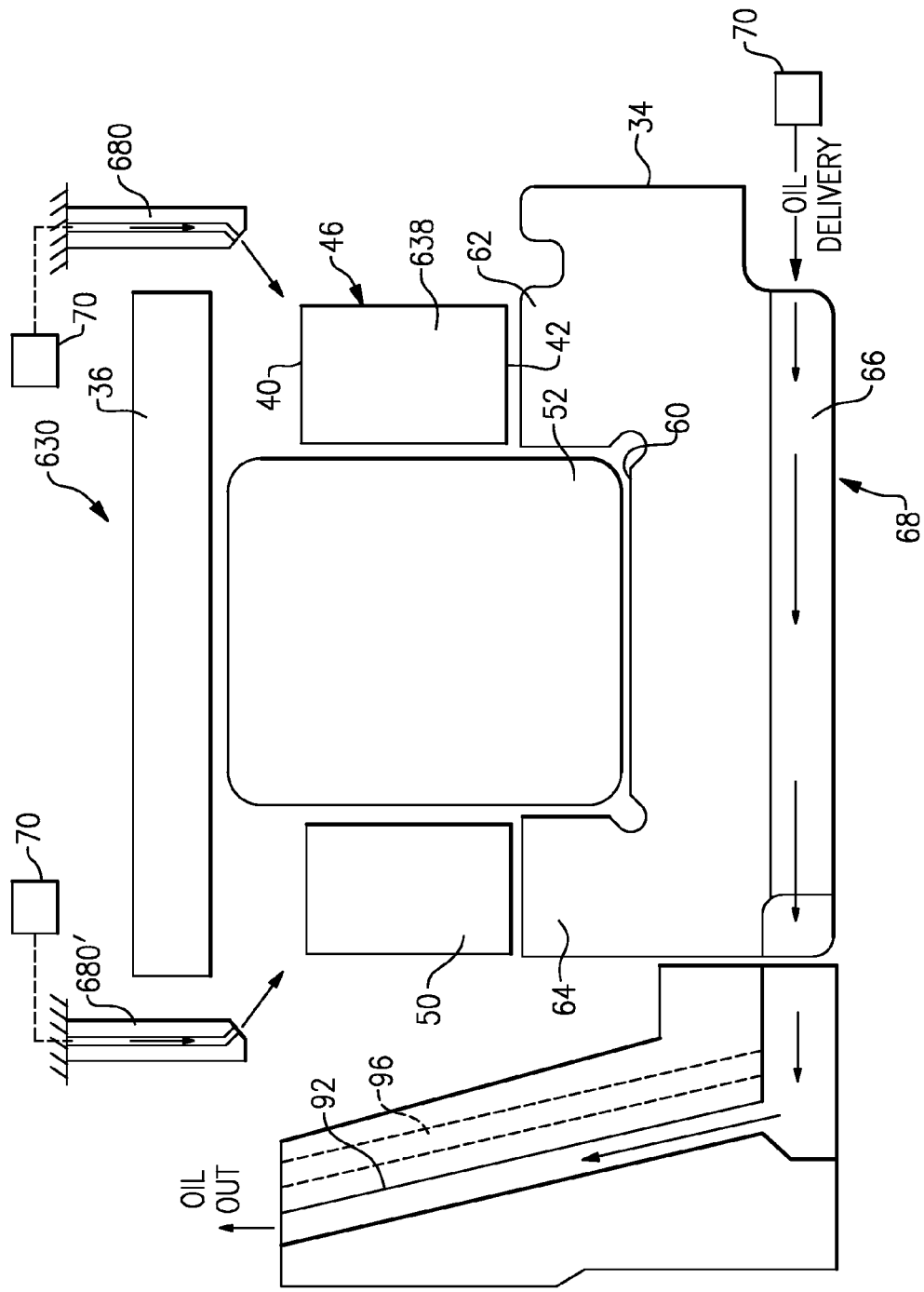
FIG. 10 illustrates another example bearing system having multiple fluid nozzles that dispense fluid to a circumferential outer side of a bearing cage.

FIG. 10 illustrates another example bearing system 630 that is similar to the bearing system 430 of FIG. 8. In this example, the fluid nozzles 680 and 680' dispense the oil between the circumferential outer side 40 of the bearing cage 638 and the second bearing ring 36. The clearance between the circumferential outer side 40 and the second bearing ring 36 is greater than the clearance between the circumferential inner side 42 and the first bearing ring 34. The greater clearance facilitates introducing a greater percentage of the oil dispensed from the fluid nozzles 680 and 680' to the roller elements 52. Optionally, the bearing cage 638, the second bearing ring 36, or both may include scoops that are similar to the scoops shown in previous examples.

Figure 11:
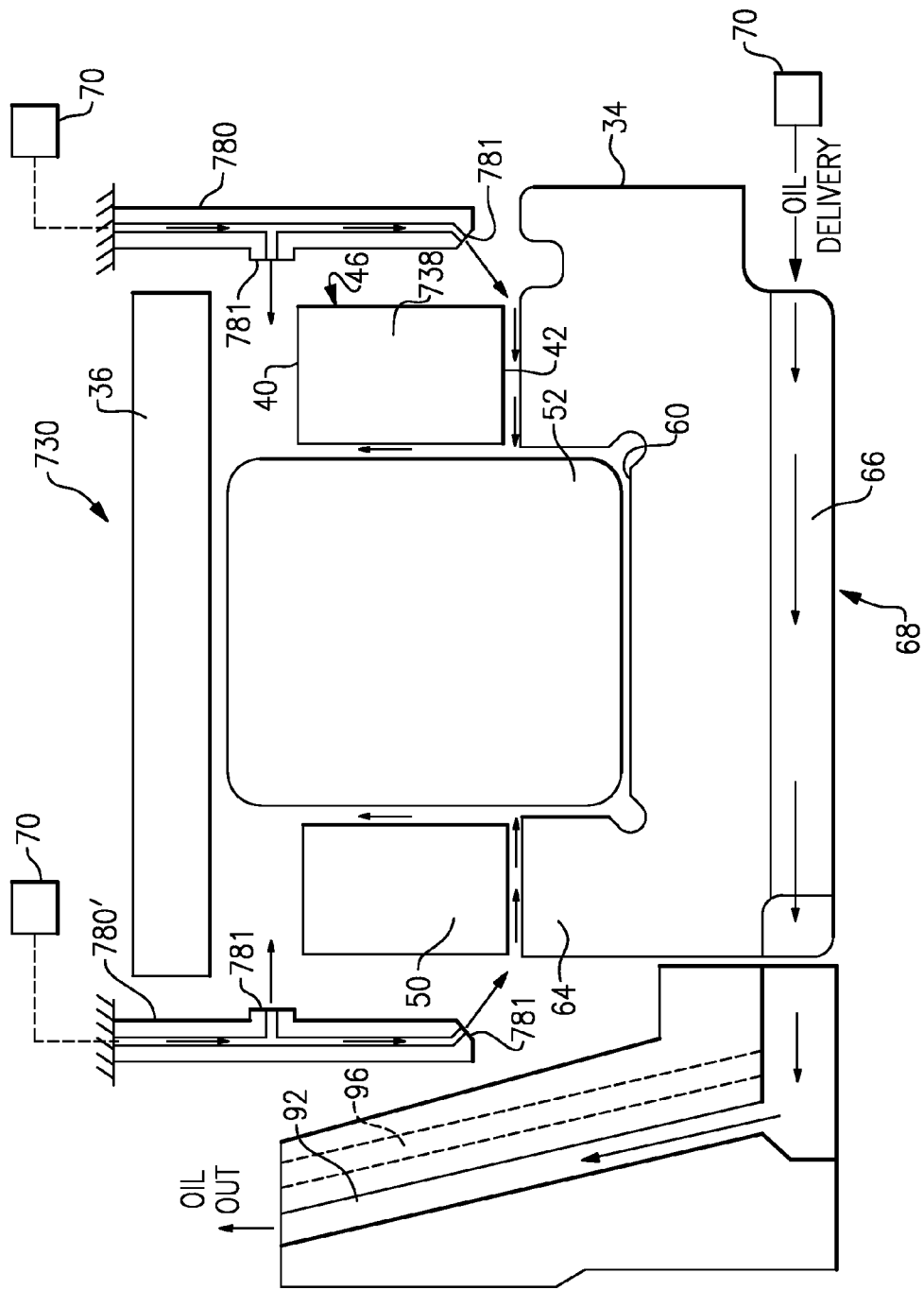
FIG. 11 illustrates another example bearing system having multiple fluid nozzles that dispense fluid to a circumferential outer side and a circumferential inner side of a bearing cage.

FIG. 11 illustrates another example bearing system 730 that is similar to the bearing system 630 of FIG. 10. In this example, fluid nozzles 780 and 780' each include multiple nozzle jets 781 to dispense the oil. The radially outer nozzle jets 781 (relative to the engine centerline 12) dispense oil between the circumferential outer side 40 of the bearing cage 738 and the second bearing ring 36, and the radially inner nozzle jets 781 dispense oil between the circumferential inner side 42 of the bearing cage 738 and the second bearing ring 36. Dispensing the oil at multiple locations facilitates introducing a greater percentage of the oil from the fluid nozzles 780 and 780' to the roller elements 52. Optionally, the bearing cage 738, the second bearing ring 36, or both may include scoops that are similar to the scoops shown in previous examples.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A bearing system comprising:
   a first bearing ring;
   a second bearing ring spaced radially outwards from the first bearing ring;
   a bearing cage between the first bearing ring and the second bearing ring, the bearing cage including a circumferential outer side, a circumferential inner side, and circumferentially spaced retainer portions between a first axial end and a second axial end;
   roller elements located in the retainer portions; and
   at least one fluid nozzle axially spaced from the bearing cage for providing a fluid to the roller elements, wherein at least one of the first axial end or the second axial end of the bearing cage includes a scoop protruding axially from the bearing cage.

2. The bearing system as recited in claim 1, wherein the at least one fluid nozzle is located adjacent to the first axial end of the bearing cage, wherein the first axial end is axially forward relative to an engine centerline of a gas turbine engine.

3. The bearing system as recited in claim 1, wherein the at least one fluid nozzle is located adjacent to the axially trailing end of the bearing cage with reference to a gas turbine engine.

4. The bearing system as recited in claim 1, wherein the scoop includes a recess disposed in the scoop and opening in a radially inward direction.

5. The bearing system as recited in claim 4, wherein the recess has a semi-circular cross section.

6. The bearing system as recited in claim 4, wherein the recess is at a radially inward side of the scoop.

7. The bearing system as recited in claim 1, wherein the scoop protrudes along an oblique direction relative to a central axis of the bearing cage.

8. The bearing system as recited in claim 7, wherein the scoop includes a recess opening in a radially inward direction.

9. The bearing system as recited in claim 1, wherein at least one of the circumferential inner side or the circumferential outer side of the bearing cage includes a recess.

10. The bearing system as recited in claim 1, wherein the first bearing ring includes a raceway located between a forward ring land and a trailing ring land, and the bearing cage includes a forward cage land corresponding to the forward ring land and a trailing cage land corresponding to the trailing ring land, wherein axial widths of the forward cage land and the trailing cage land are greater than axial widths of the forward ring land and the trailing ring land.

11. The bearing system as recited in claim 1, wherein the first bearing ring includes a raceway and a fluid passage located radially inwards of the raceway.

12. The bearing system as recited in claim 11, wherein the fluid passage does not include any holes directly communicating fluid between the fluid passage and the raceway.

13. The bearing system as recited in claim 11, wherein the fluid passage moves fluid in a first axial direction, wherein the scoop redirects fluid to move in a second axial direction opposite the first axial direction.

14. The bearing system as recited in claim 11, further comprising a runner plate adjacent the first bearing ring, the runner plate having a first passage fluidly connected with the fluid passage of the first bearing ring and a second fluid passage also fluidly connected with the fluid passage of the first bearing ring.

15. The bearing system as recited in claim 14, wherein at least a portion of the runner plate is radially outward of the first bearing ring.

16. The bearing system as recited in claim 14, wherein the scoop is at least partially axially disposed between the runner plate and the bearing cage.

17. The bearing system as recited in claim 1, wherein both the first axial end and the second axial end of the bearing cage includes a scoop protruding axially from the bearing cage.

18. The bearing system as recited in claim 1, wherein the nozzle provides oil at a location radially outward of the radially outer side of the first bearing ring.

19. The bearing system as recited in claim 1, wherein the at least one fluid nozzle includes a plurality of fluid nozzles.

20. The bearing system as recited in claim 19, wherein one of the plurality of nozzles is located adjacent to the forward end of the bearing cage and another of the plurality of fluid nozzles is located adjacent to the trailing end of the bearing cage.

21. A turbine engine comprising:
   an engine shaft;
   a combustion section;
   a turbine section downstream of the combustion section and including a turbine rotor rotatable about the engine shaft;
   a bearing system including a first bearing ring coupled with the engine shaft, a second bearing ring spaced radially outwards from the first bearing ring, a bearing cage between the first bearing ring and the second bearing ring, the bearing cage including circumferentially spaced retainer portions between a first axial end and a second axial end and roller elements located in the retainer portions, and at least one fluid nozzle axially spaced from the bearing cage for providing a fluid to the roller elements, wherein at least one of the first axial end or the second axial end of the bearing cage includes a scoop protruding axially from the bearing cage.

22. A method of providing a fluid to a bearing system that includes a first bearing ring, a second bearing ring spaced radially outwards from the first bearing ring, a bearing cage between the first bearing ring and the second bearing ring, the bearing cage including circumferentially spaced retainer portions between a first axial end and trailing second axial end, and roller elements located in the retainer portions, wherein at least one of the first axial end or the second axial end of the bearing cage includes a scoop protruding axially from the bearing cage, the method comprising:

providing a fluid to at least one fluid nozzle that is axially spaced from the bearing cage; and dispensing the fluid from the at least one fluid nozzle in a direction toward a clearance between the bearing cage and at least one of the first bearing ring or the second bearing ring to expose the roller elements to the fluid.

23. The method as recited in claim 22, wherein the clearance is between a radially inner side of the bearing cage and a radially outer side of the first bearing ring.

24. The method as recited in claim 22, wherein the clearance is between a radially outer side of the bearing cage and a radially inner side of the second bearing ring.

25. The method as recited in claim 22, wherein the clearance is between a radially inner side of the bearing cage and a radially outer side of the first bearing ring and between a radially outer side of the bearing cage and a radially inner side of the second bearing ring.

26. The method as recited in claim 22, including providing the fluid to a first nozzle of the at least one fluid nozzle located adjacent to the axially forward end of the bearing cage and to a second nozzle of the at least one nozzle located adjacent to the axially trailing end of the bearing cage.

* * * * *